United States Patent
Teraji et al.

(10) Patent No.: US 6,932,175 B2
(45) Date of Patent: Aug. 23, 2005

(54) CONTROL APPARATUS FOR HYBRID VEHICLE

(75) Inventors: Atsushi Teraji, Yokohama (JP); Tomonori Urushihara, Yokohama (JP); Koji Hiraya, Yokohama (JP); Toru Noda, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 23 days.

(21) Appl. No.: 10/423,910

(22) Filed: Apr. 28, 2003

(65) Prior Publication Data

US 2003/0230441 A1 Dec. 18, 2003

(30) Foreign Application Priority Data

Jun. 18, 2002 (JP) ........................................ 2002-177372

(51) Int. Cl.[7] ................................................. B60K 6/04
(52) U.S. Cl. ..................................... 180/65.2; 180/65.4
(58) Field of Search .............................. 180/65.2, 65.3, 180/65.4; 123/294, 295; 701/70

(56) References Cited

U.S. PATENT DOCUMENTS

| | | | | |
|---|---|---|---|---|
| 4,335,429 A | * | 6/1982 | Kawakatsu | ................. 701/102 |
| 5,476,072 A | * | 12/1995 | Guy | ....................... 123/48 AA |
| 5,664,635 A | * | 9/1997 | Koga et al. | ................. 180/65.3 |
| 5,697,466 A | * | 12/1997 | Moroto et al. | ............. 180/65.2 |
| 6,105,550 A | * | 8/2000 | Nieberding | ................. 123/294 |
| 6,390,054 B1 | * | 5/2002 | Yang | ........................... 123/295 |
| 6,484,833 B1 | * | 11/2002 | Chhaya et al. | ............. 180/65.4 |
| 6,561,157 B2 | * | 5/2003 | zur Loye et al. | ........... 123/295 |
| 6,570,265 B1 | * | 5/2003 | Shiraishi et al. | .......... 290/40 C |

FOREIGN PATENT DOCUMENTS

JP          2001-207880 A          8/2001

* cited by examiner

*Primary Examiner*—Frank Vanaman
(74) *Attorney, Agent, or Firm*—Shinjyu Global IP Counselors, LLP

(57) ABSTRACT

A control apparatus is configured for a hybrid vehicle that can operate highly efficiently in all operating regions. The hybrid vehicle utilizes an internal combustion engine that can be operating using either compression self-ignition combustion or spark ignition combustion. An electronic control unit has a combustion pattern determining section that determines (selects) the combustion method with which to run the internal combustion engine based on the output required by the vehicle. As a result, the internal combustion engine can be operated using the combustion method that is appropriate in view of the required output and unnecessary engine output can be prevented. Thus, a hybrid system that can be operated with high efficiency and at high output in all operating regions can be achieved.

19 Claims, 10 Drawing Sheets

CONTROL APPARATUS FOR HYBRID VEHICLE

BACKGROUND OF THE INVENTION

1. Field of the Invention

The present invention generally relates to a control apparatus for a hybrid vehicle. More specifically, the present invention relates to a control apparatus for a hybrid vehicle that utilizes an engine that can switch between compression self-ignition combustion and spark ignition combustion.

2. Background Information

A control apparatus for a hybrid vehicle is disclosed in Japanese Laid-Open Patent Publication No. 2001-207880 which describes controlling an engine operation to improve the fuel efficiency of an internal combustion engine installed in a hybrid vehicle. In particular, this is publication discloses reducing the rotational speed of the engine with respect to the required output by switching the operating mode of the engine from a four-cycle mode to a two-cycle mode. This technique allows the fuel efficiency to be improved by expanding the engine operating region for which stratified charge combustion is possible so as to include higher loads.

In view of the above, it will be apparent to those skilled in the art from this disclosure that there exists a need for an improved control apparatus for a hybrid vehicle. This invention addresses this need in the art as well as other needs, which will become apparent to those skilled in the art from this disclosure.

SUMMARY OF THE INVENTION

It has been discovered that as the demand for improved fuel efficiency continues to rise, the control apparatus described in the above-mentioned publication is not sufficient to meet this demand and still can be improved.

Specifically, compression self-ignition combustion has better thermal efficiency than the aforementioned stratified charge combustion and it also has fewer exhaust emissions. Thus, it is feasible to use an internal combustion engine that performs compression self-ignition combustion in a hybrid vehicle.

However, compression self-ignition combustion is unstable in operating regions of high rotational speed and high load. Thus, compression self-ignition combustion has been limited to operating regions of low rotational speed and low load.

The present invention was conceived in view of these problems. One object of the present invention is to provide a hybrid vehicle control apparatus that can secure high efficiency and high output in all operating regions by using an internal combustion engine that can switch between compression self-ignition combustion and spark ignition combustion and appropriately controlling the type of combustion performed by the internal combustion engine in accordance with the output required by the vehicle.

The foregoing object can basically be attained by providing a hybrid vehicle control apparatus comprising an internal combustion engine, an electric generator, an electric storage, an electric motor and an operating mode selecting device. The internal combustion engine is configured to be selectively operated in one of a compression self-ignition combustion operating mode and a spark ignition combustion operating mode. The electric generator is mechanically coupled to the internal combustion engine. The electric storage device is electrically coupled to the electric generator. The electric motor is electrically coupled to the electric storage device. The operating mode selecting device is configured to control an operating state of the internal combustion engine, the electric generator, and the electric motor, and to select one of the compression self-ignition combustion operating mode and the spark ignition combustion operating mode in accordance with a required vehicle output.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
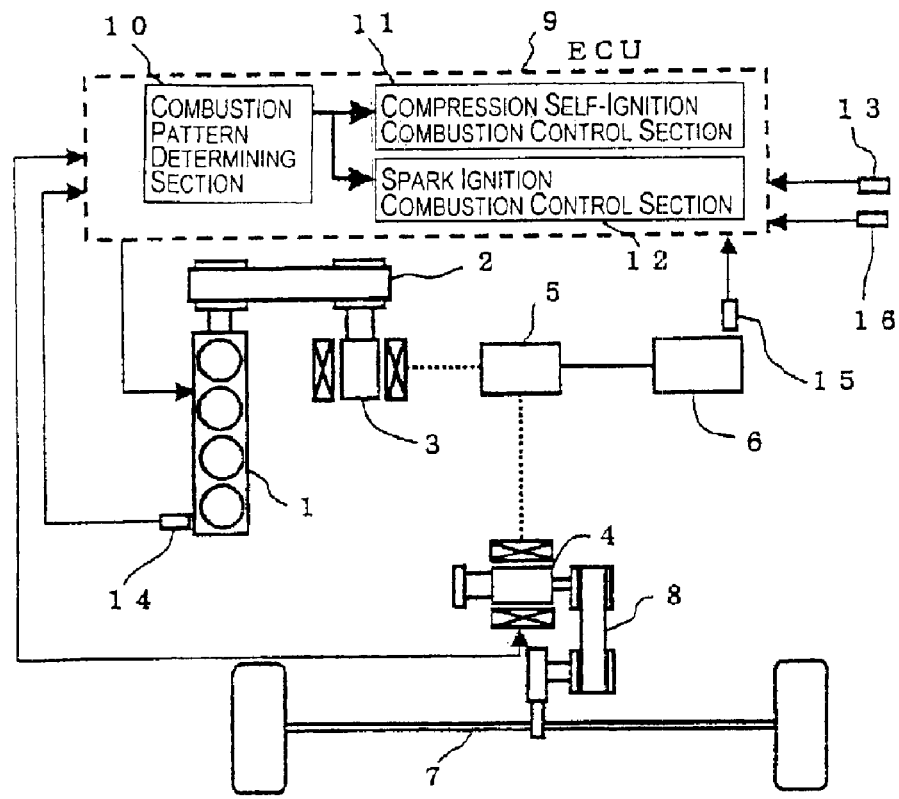
FIG. 1 is a simplified schematic view of a series hybrid vehicle system in accordance with a first embodiment of the present invention.

Referring initially to FIG. 1, a simplified schematic view of a series type hybrid vehicle is illustrated in accordance with a first embodiment of the present invention. As explained below in more detail, the hybrid vehicle is equipped with a hybrid vehicle control apparatus of the present invention selects an operating mode in accordance with the output requirements of the vehicle by such that the hybrid vehicle operates either in a compression self-ignition combustion operating mode or a spark ignition combustion operating mode.

As shown in FIG. 1, the hybrid vehicle in accordance with this embodiment basically includes an internal combustion engine 1, a first (starting-purpose) transmission device 2, a first starting-purpose motor-generator 3, a second (driving-purpose) motor-generator 4, an inverter 5, a battery 6, a wheel axle 7, a second transmission 8 and an electronic control unit (ECU) 9.

The starting-purpose motor-generator 3 is mechanically connected to the internal combustion engine 1 through the starting-purpose transmission device 2. The battery 6 is electrically connected to both the starting-purpose motor-generator 3 and the driving-purpose motor-generator 4 through the inverter 5. The transmission 8 transmits a driving force from the driving-purpose motor-generator 4 to the wheel axle 7. The electronic control unit 9 is operatively coupled to the internal combustion engine 1, the starting-purpose transmission device 2, the starting-purpose motor-generator 3, the driving-purpose motor-generator 4, the inverter 5 and the battery 6.

The electronic control unit 9 controls the internal combustion engine 1, the electric generator, and the electric motor in order to achieve the output required by the vehicle. Thus, the hybrid vehicle control apparatus of the present invention can select, as appropriate, whether to operate the internal combustion engine using compression self-ignition combustion or spark ignition combustion. Thus, unnecessary output from the internal combustion engine 1 can be prevented and a hybrid system that can achieve high output and highly efficient and clean operation in all operating regions can be obtained.

The internal combustion engine 1 is configured and arranged to operate using either compression self-ignition combustion or spark ignition combustion. The internal combustion engine 1 drives the starting-purpose motor-generator 3. Driven by the internal combustion engine 1, the starting-purpose motor-generator 3 generates electricity that is used to charge the battery 6. The driving-purpose motor-generator 4 receives electricity discharged from the battery 6 and drives the wheel axle 7 via the transmission 8.

The electronic control unit 9 preferably includes a microcomputer with a combustion control program that controls the operation, e.g., combustion types of the internal combustion engine as discussed below. The electronic control unit 9 can also include other conventional components such as an input interface circuit, an output interface circuit, and storage devices such as a ROM (Read Only Memory) device and a RAM (Random Access Memory) device. The electronic control unit 9 is capable of selectively controlling any of the components 1–5 in accordance with the control program. It will be apparent to those skilled in the art from this disclosure that the precise structure and algorithms for electronic control unit 9 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The electronic control unit 9 is basically configured to include a combustion pattern determining section 10, a compression self-ignition combustion control section 11 and a spark ignition combustion control section 12. The combustion pattern determining section 10 determines (selects) whether to operate the internal combustion engine 1 using compression self-ignition combustion or spark ignition combustion. The compression self-ignition combustion control section 11 controls the combustion parameters when compression self-ignition combustion has been selected. The spark ignition combustion control section 12 controls the combustion parameters when spark ignition combustion has been selected.

The electronic control unit 9 executes prescribed processing operations based on input signals from a plurality of sensors 13–16 as well as various other sensors (not shown) that detect the operating conditions of the engine and/or other components of the vehicle. The accelerator pedal sensor 13 is configured and arranged to detect an operational request or output required by the vehicle. The rotational speed sensor 14 is configured and arranged to detect the engine rotational speed of the internal combustion engine 1. The voltage sensor 15 is configured and arranged to detect the voltage of the battery 6. The vehicle speed sensor 16 is configured and arranged to detect the speed of the vehicle. By executing the prescribed processing operations, the electronic control unit 9 controls the engine 1 (including the throttle valve (not shown) of the internal combustion engine 1, the fuel injection valves (not shown), and the spark plugs (not shown)), the starting-purpose motor-generator 3, the driving-purpose motor-generator 4, the generator 8, etc., in an integrated manner.

Figure 2:
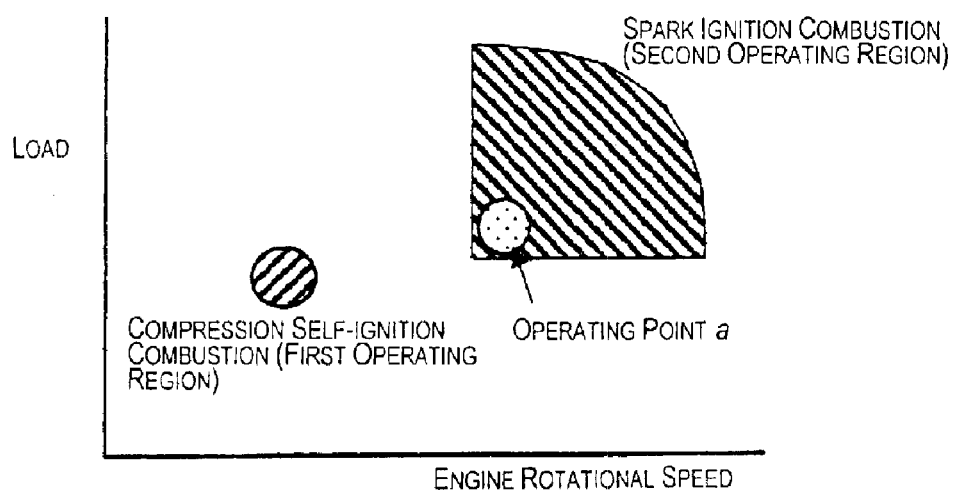
FIG. 2 is an operation map (of the relationship between operating region and combustion method) for the internal combustion engine 1.

FIG. 2 shows an operation map for the internal combustion engine 1 used in the hybrid vehicle of this embodiment. As shown in FIG. 2, the internal combustion engine 1 is operated using compression self-ignition combustion in a first preset operating region (hereinafter called "first operating region") of low engine speed and using spark ignition combustion in a second preset operating region (hereinafter called "second operating region") of higher engine speed than the first operating region.

In this operation map, the first operating region and the second operating region are set so that the regions are not closely adjacent to each other. This arrangement is used because when the internal combustion engine 1 is operated using both compression self-ignition combustion and spark ignition combustion, there are operating regions where neither type of combustion can be conducted in a stable manner. By stopping the internal combustion engine 1 in such regions, the emission of $NO_x$ and HC can be reduced and a highly efficient and clean hybrid vehicle can be achieved. In these regions between the first and second operating regions, the vehicle is solely powered by the driving-purpose motor-generator 4 without the engine 1 operating.

Figure 3:
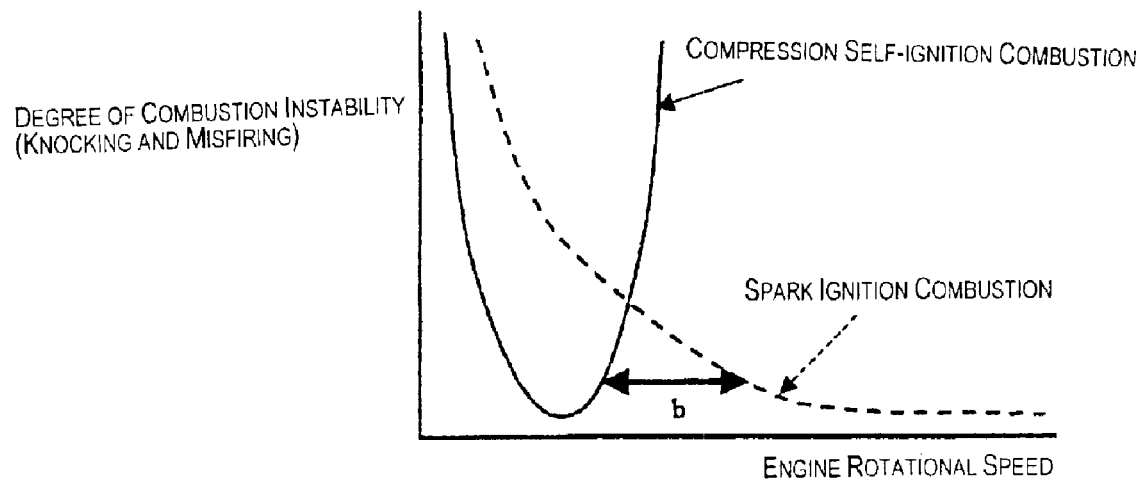
FIG. 3 is a graph illustrating the relationship between engine rotational speed Ne and the degree of combustion instability.

More specifically, as shown in FIG. 3, the combustion stability is high (i.e., the degree of combustion instability due to misfiring and knocking is low) when the internal combustion engine 1 is operated using compression self-ignition combustion in a narrow region of low engine speed and when the internal combustion engine is operated using spark ignition combustion in a region of high engine speed. However, in the operating region (indicated by the arrow b in FIG. 3) which lies between the regions where compression self-ignition combustion and spark ignition combustion are stable, combustion is unstable regardless of which of the combustion methods that are used. Thus, the fuel efficiency will worsen and exhaust emissions will increase if the internal combustion engine 1 is operated. Therefore, the first operating region and the second operating region are separated from each other so that the internal combustion engine 1 is stopped in the unstable region.

The operating point of best fuel efficiency for spark ignition combustion (hereinafter called "operating point a") is contained in the second operating region. The internal combustion engine 1 is operated at the operating point a as much as possible when the internal combustion engine 1 is operated using spark ignition combustion.

Figure 4:
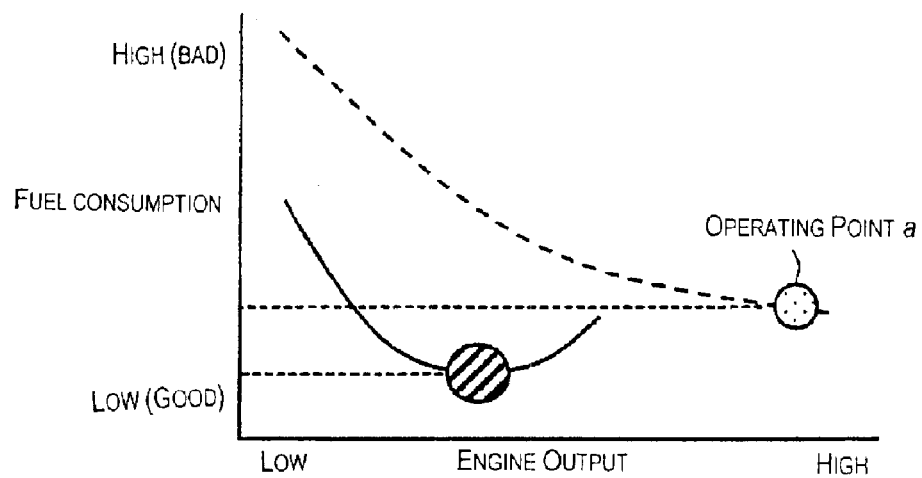
FIG. 4 is a graph comparing compression self-ignition combustion and spark ignition combustion in terms of the relationship between the engine output and fuel consumption.

The relationship between the output and fuel consumption of the internal combustion engine 1 is shown in FIG. 4. In FIG. 4, the curved solid line illustrates the relationship obtained when compression self-ignition combustion is used, while the curved broken line illustrates the relationship obtained when spark ignition combustion is used. As shown in FIG. 4, when compression self-ignition combustion is used, the fuel consumption is lower than the fuel consumption at the operating point of best fuel efficiency (operating point a) for spark-ignition combustion. Therefore, an extremely highly efficient hybrid vehicle can be achieved by operating the internal combustion engine 1 using compression self-ignition combustion whenever the output requirements of the vehicle allow it and at the operating point a as often as possible when using spark ignition combustion.

Next, the hybrid vehicle operation control (i.e., selection of the operating mode in response to the output required by the vehicle) executed by the electronic control unit 9 will now be explained.

Figure 5:
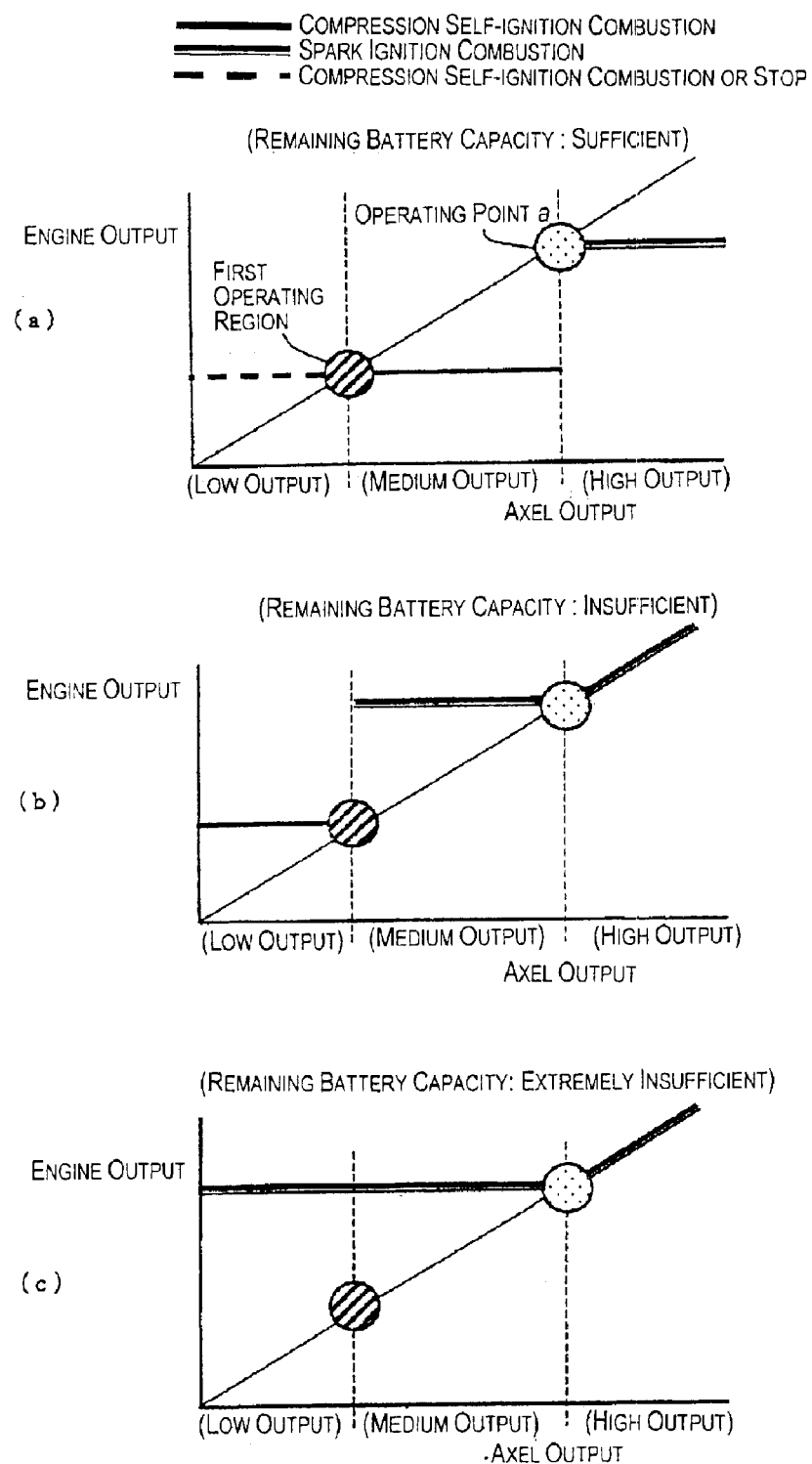
FIG. 5 is a series of graphs illustrating the relationship between the axle output and the engine output for each of the combustion methods being performed by internal combustion engine.

FIG. 5 shows the relationship between the required output (wheel axle output) of the vehicle and the output of the internal combustion engine 1 for this embodiment, and illustrates the control described below using flowcharts. Graph (a) of FIG. 5 illustrates a case in which the remaining capacity of the battery 6 is sufficient to drive the vehicle at the required output using only the driving-purpose motor-generator 4. Graph (b) of FIG. 5 illustrates a case in which the remaining capacity of the battery 6 is insufficient to drive the vehicle at the required output using only the driving-purpose motor-generator 4. Graph (c) of FIG. 5 illustrates a case in which the remaining capacity of the battery 6 is extremely insufficient to drive the vehicle at the required output using only the driving-purpose motor-generator 4. Operation of the internal combustion engine 1 is stopped when it is not necessary to charge the battery 6.

Now the details of the control executed by the electronic control unit 9 are explained using the flowcharts shown in FIGS. 6 to 9.

Figure 6:
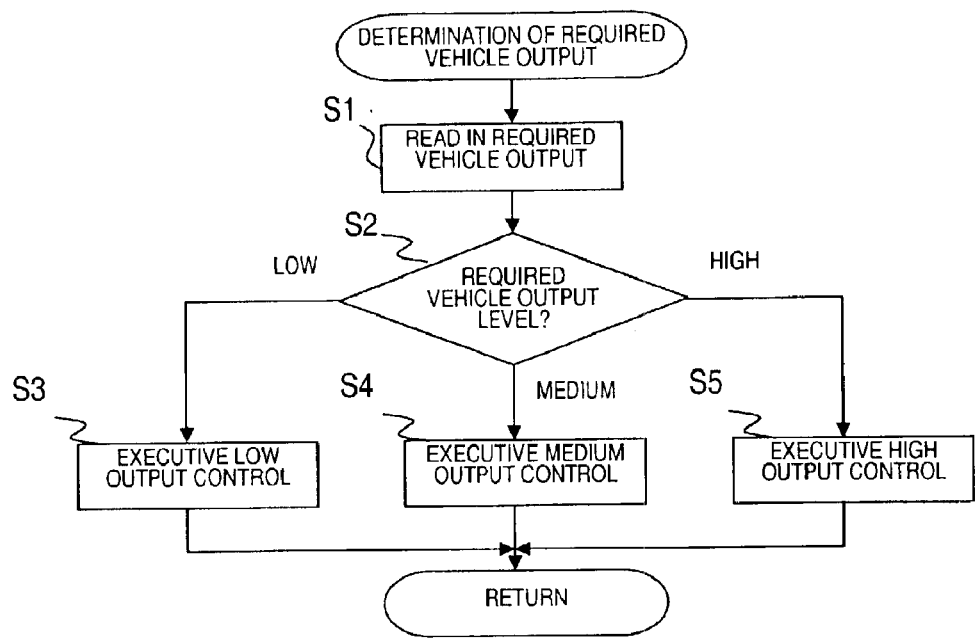
FIG. 6 is a flowchart illustrating the operation control executed by the engine control unit to make the determination of the output required by the vehicle.

FIG. 6 is a flowchart for determining the required axle output (hereinafter called simply "required vehicle output") of the vehicle.

In step S1 of FIG. 6, the electronic control unit 9 reads the currently required vehicle output of the vehicle. The required vehicle output is calculated based on, for example, an input signal from the accelerator pedal sensor 12 to the electronic control unit 9.

In step S2, the electronic control unit 9 selects the mode of combustion based on the required vehicle output read by the electronic control unit 9 in the previous step. More specifically, the electronic control unit 9 proceeds to step S3 if the required vehicle output is low, step S4 if the required vehicle output is medium, or step S5 if the required vehicle output is high. In this embodiment, the output required by the vehicle is considered to be low when the required vehicle output is below an engine output of the internal combustion engine 1 operating in the aforementioned first operating region (i.e., when the engine is operated using compression self-ignition combustion). The output required by the vehicle is considered to be medium when the required vehicle output exceeds the engine output of the internal combustion engine 1 operating in the first operating region but is below the output of the internal combustion engine 1 operating at the operating point a (i.e., when operated using spark ignition combustion at the point of best fuel efficiency). The output required by the vehicle is considered to be large when the required vehicle output exceeds the engine output of the internal combustion engine 1 operating at the operating point a.

Figure 7:
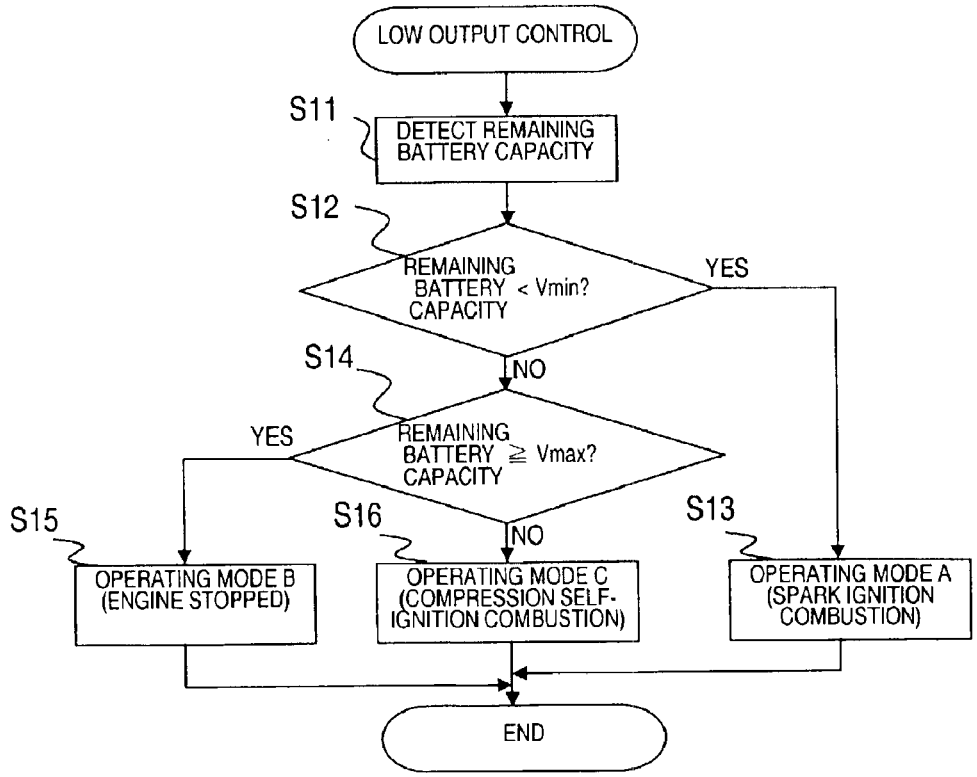
FIG. 7 is a flowchart showing the operation control executed by the hybrid vehicle when the required output of the vehicle is determined to be low.

FIG. 7 is a flowchart showing the operation control executed by the electronic control unit 9 when the required vehicle output of the vehicle is determined to be low. This control starts when the electronic control unit 9 proceeds to step S3 of FIG. 6.

In step S11 of FIG. 7, the electronic control unit 9 detects the remaining capacity (battery capacity) of the battery 6. The electronic control unit 9 also establishes a battery maximum value Vmax (corresponds to the "second prescribed capacity") and a battery minimum value Vmin (corresponds to the "first prescribed capacity"). The battery maximum value Vmax represents the battery capacity (electric power capacity) with which that the battery 6 can drive the vehicle sufficiently without being charged simultaneously. The battery minimum value Vmin represents the minimum battery capacity that is required based on the vehicle and other factors. This detection is accomplished based on, for example, an input signal from the voltage sensor 15.

In step S12, the electronic control unit 9 determines if the detected battery capacity is extremely low. This determination is accomplished by, for example, determining if the detected battery capacity is less than the battery minimum value Vmin. If the battery capacity is determined to be extremely low, the electronic control unit 9 proceeds to step S13. If not, the electronic control unit 9 proceeds to step S14.

In step S13, the electronic control unit 9 selects an operating mode A in which the internal combustion engine 1 is operated using spark ignition combustion and the battery is charged. In this case, the internal combustion engine 1 should basically be operated at the operating point a (point of best fuel efficiency). However, the battery charging time can be shortened if the internal combustion engine 1 is operated at an even higher output.

In step S14, the electronic control unit 9 determines if the battery 6 needs to be charged. This determination is accomplished by, for example, determining if the detected battery capacity is greater than or equal to the battery maximum value Vmax. If the remaining battery capacity is greater than or equal to the battery maximum value Vmax, the electronic control unit 9 proceeds to step S15 and selects an operating mode B in which the internal combustion engine 1 is stopped.

Meanwhile, if the remaining battery capacity is less than the battery maximum value Vmax, the electronic control unit 9 proceeds to step S16, where the electronic control unit 9 selects an operating mode C in which the internal combustion engine 1 is operated using compression self-ignition combustion and the battery 6 is charged.

Figure 8:
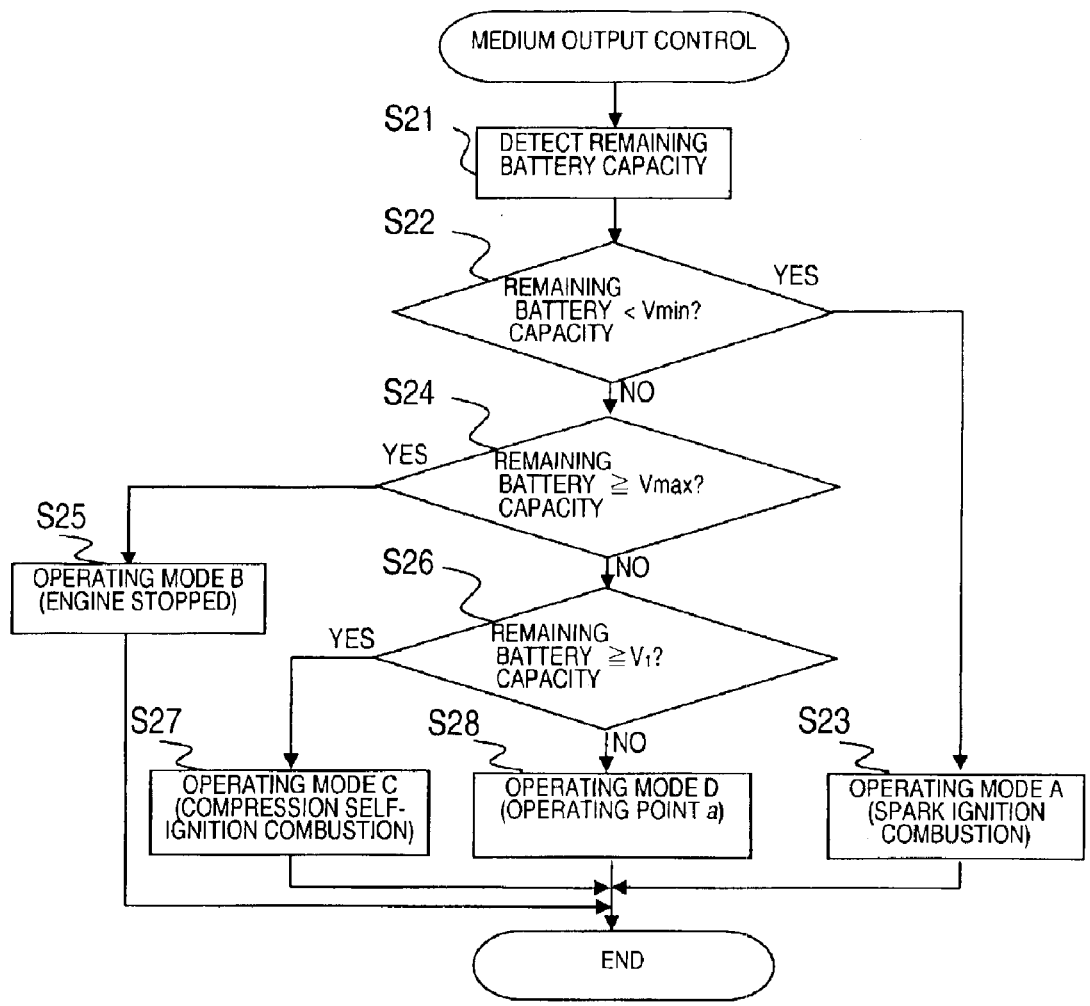
FIG. 8 is a flowchart showing the operation control executed by the hybrid vehicle when the required output of the vehicle is determined to be medium.

FIG. 8 is a flowchart showing the operation control executed by the electronic control unit 9 when the required vehicle output of the vehicle is determined to be medium. This control starts when the electronic control unit 9 proceeds to step S4 of FIG. 6.

Since steps S21 to S25 of FIG. 8 are the same as steps S11 to S15 of FIG. 7, the operations of these steps S21 to S25 can be understood by the above-description of steps S11 to S15. Thus, these steps will not be explained as this point for the sake of brevity. In step S26, the electronic control unit 9 determines if the battery capacity is sufficient even though it is not greater than or equal to the battery maximum value Vmax. This step serves to determine the degree of battery charging that should be executed when the vehicle is driven (i.e., together with battery discharge). More specifically, in this embodiment, this step serves to determine if the detected battery capacity is greater than or equal to a sufficient battery capacity V1 (Vmin<V1<Vmax, corresponds to the "third prescribed capacity").

If the battery capacity is determined to be sufficient to meet the required vehicle output, the required amount of battery charging is not large, and then the electronic control unit 9 proceeds to step S27 where it selects operating mode C. In operating mode C, the internal combustion engine 1 is operated using compression self-ignition combustion and the battery 6 is charged. Meanwhile, if the battery capacity is determined to be insufficient to meet the required vehicle output, the required amount of battery charging is large, and then the electronic control unit 9 proceeds to step S28 where it selects an operating mode D. In operating mode D, the internal combustion engine 1 is operated at the operating point a using spark ignition combustion and the battery 6 is charged.

Figure 9:
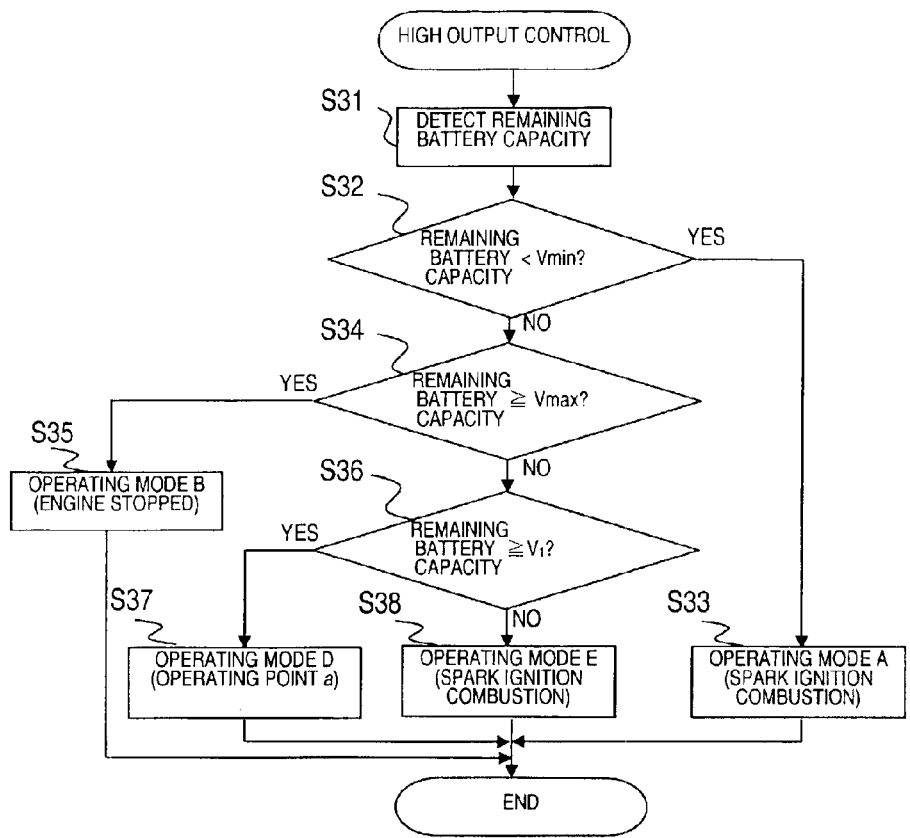
FIG. 9 is a flowchart showing the operation control executed by the hybrid vehicle when the required output of the vehicle is determined to be high.

FIG. 9 is a flowchart showing the operation control executed by the electronic control unit 9 when the required vehicle output of the vehicle is determined to be high. This control starts when the electronic control unit 9 proceeds to step S5 of FIG. 6.

Since steps S31 to 35 of FIG. 9 are the same as steps S21 to S25 of FIG. 8, the operations of these steps S31 to S35 can be understood by the above-description of steps S21 to S25. Thus, these steps will not be explained as this point for the sake of brevity. If the electronic control unit 9 determines that the remaining battery capacity is sufficient to meet the required vehicle output in step S36, it proceeds to step S37 where it selects the operating mode D. In operating mode D, the internal combustion engine 1 is operated at the aforementioned operating point a and the battery 6 is charged. Meanwhile, if the remaining battery capacity is found to be insufficient to meet the required vehicle output, the electronic control unit 9 proceeds to step S38 where it selects an operating mode E. In operating mode E, the internal combustion engine 1 is operated using spark ignition combustion in accordance with the output required by the vehicle and the battery 6 is charged.

This first embodiment has the following ten effects.

First, the internal combustion engine 1 is operated using compression self-ignition combustion in a preset first operating region and the internal combustion engine 1 is operated using spark ignition combustion in a second operation region of higher engine speeds than the first operating region. Consequently, the hybrid vehicle can be controlled so as to both secure high power output and achieve highly efficient and clean operation (low exhaust emissions) by selecting the appropriate combustion method in accordance with the output required by the vehicle.

Second, since the first operating region and the second operating region are not closely adjacent to each other, the operation of the internal combustion engine is stopped in regions where the combustion would be unstable regardless of whether compression self-ignition combustion or spark ignition combustion were used. As a result, unstable combustion can be avoided and worsening of the fuel efficiency and exhaust emissions can be reliably prevented.

Third, since the operating point of best fuel efficiency (operating point a) for spark ignition combustion is included in the second operating region, a highly efficient hybrid vehicle can be achieved by operating the engine at the operating point of best fuel efficiency as much as possible when using spark ignition combustion.

Fourth, when the output required by the vehicle is less than or equal to a prescribed value, the operating mode C is selected in which the internal combustion engine 1 is operated using compression self-ignition combustion and the battery 6 is charged. In this embodiment, when the output required by the vehicle is below the output of the internal combustion engine 1 when the engine 1 is operated using compression self-ignition combustion. As a result, the battery 6 can be charged while operating the internal combustion engine 1 in a highly efficient and clean manner.

Fifth, when the output required by the vehicle exceeds a prescribed value, the operating mode D is selected in which the internal combustion engine 1 is operated using spark ignition combustion at the operating point a and the battery 6 is charged. As a result, the battery 6 can be charged while operating the internal combustion engine 1 in an efficient manner.

Sixth, when the output required by the vehicle exceeds the output of the internal combustion engine 1 when the engine 1 is operated at the operating point of best fuel efficiency (operating point a), the operating mode E is selected in which the internal combustion engine 1 is operated using spark ignition combustion in accordance with the output required by the vehicle and the battery 6 is charged. As a result, the battery 6 can be charged sufficiently and an unstable driving force caused by insufficient electric power can be avoided.

Seventh, when the remaining battery capacity is greater than or equal to a second prescribed capacity (battery maximum value Vmax) such that battery charging is not necessary, the operating mode B is selected in which the operation of the internal combustion engine 1 is stopped. As a result, fuel consumption can be held to a minimum and an even more highly efficient hybrid vehicle can be achieved.

Eighth, when the remaining battery capacity is below a first prescribed value (battery minimum value Vmin) that was established as the minimum value thereof, the operating mode A is selected in which the internal combustion engine 1 is operated using spark ignition combustion regardless of the output required by the vehicle and the battery 6 is charged. As a result, the battery 6 can be recharged early (urgently) and an unstable driving force caused by insufficient electric power can be avoided.

Ninth, when the output required by the vehicle exceeds the aforementioned prescribed value and the remaining battery capacity is greater than or equal to a third prescribed value (sufficient battery capacity V1), the operating mode C is selected in which the internal combustion engine 1 is operated using compression self-ignition combustion and the battery 6 is charged. This enables degradation of efficiency caused by excessive battery charging to be prevented. As a result, the internal combustion engine 1 can be operated as efficiently as possible while also performing the necessary battery charging.

Tenth, when the output required by the vehicle exceeds the output of the internal combustion engine 1 when the engine 1 is operated at the operating point of best fuel efficiency and the remaining battery capacity is greater than or equal to the third prescribed capacity, the operating mode D is selected in which the internal combustion engine 1 is operated at the operating point of best fuel efficiency and the battery 6 is charged. This enables degradation of efficiency caused by excessive battery charging to be prevented. As a result, the internal combustion engine 1 can be operated as efficiently as possible while also performing the necessary battery charging.

In the embodiment described above, a common sufficient battery capacity V1 is used regardless of whether the output required by the vehicle is low, medium or high. However, it is also acceptable to set appropriate values (i.e., different values) depending the output required by the vehicle. Adopting this approach would enable the engine 1 to be operated even more efficiently.

Second Embodiment

Referring now to FIGS. 10–13, a parallel hybrid vehicle system in accordance with a second embodiment will now be explained. In view of the similarity between the first and second embodiments, the parts of the second embodiment that are identical to the parts of the first embodiment are indicated using the same reference numerals as the parts of the first embodiment. Moreover, the descriptions of the parts of the second embodiment that are identical to the parts of the first embodiment may be omitted for the sake of brevity.

Figure 10:
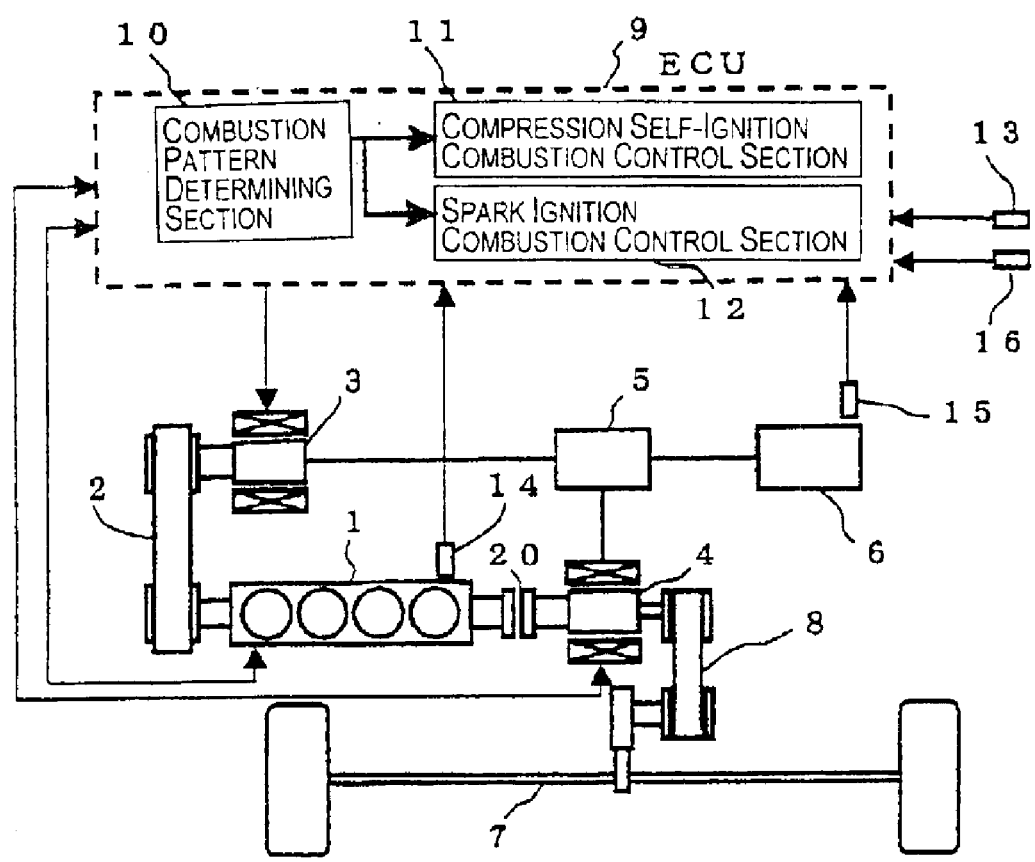
FIG. 10 is a simplified schematic view of a parallel hybrid vehicle system in accordance with a second embodiment of the present invention.

As shown in FIG. 10, a hybrid vehicle in accordance with this second embodiment differs from a hybrid vehicle in accordance with the first embodiment in that the driving-purpose motor-generator 4 is mechanically connected to the internal combustion engine 1 through a driving-purpose drive transmission device 20. Thus, the wheel axle 7 is driven by the internal combustion engine 1 and/or the driving-purpose motor-generator 4. The present invention is particularly effective in the parallel hybrid vehicle because the vehicle can be driven by an appropriate combination of the driving-purpose motor-generator 4 and the internal combustion engine 1 whose combustion method has been appropriately selected.

In this second embodiment as well, the operation map shown in FIG. 2 is used for the internal combustion engine 1 and the control operations executed regarding the internal combustion engine 1 and the determination of the load required by the vehicle are basically the same as in the first embodiment (see FIGS. 5 and 6). The operating point at which the vehicle is driven also differs depending on the internal combustion engine 1.

Below, the operation control executed by the electronic control unit 9 which is configured in accordance with this second embodiment will be described using FIGS. 11 to 13.

Figure 11:
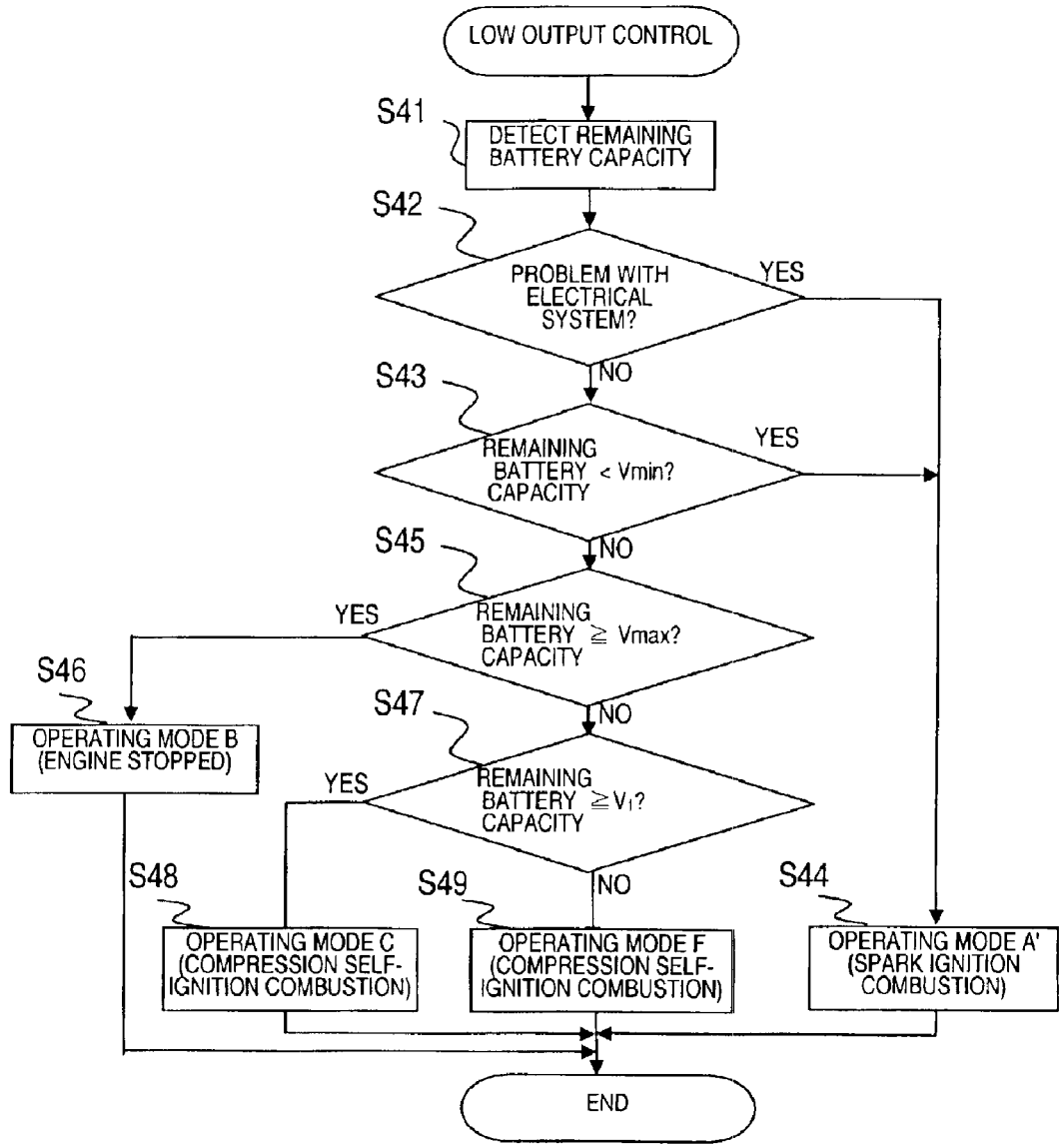
FIG. 11 is a flowchart showing the operation control executed by the hybrid vehicle of the second embodiment when the required output of the vehicle is determined to be low.

FIG. 11 is a flowchart showing the operation control executed by the electronic control unit 9 in a parallel hybrid vehicle when the required output of the vehicle is determined to be low.

In step S41, the remaining battery capacity is detected, similarly to step S11 of FIG. 7 as discussed above. Since step S41 of FIG. 11 is the same as step S1 of FIG. 7, the operations of step S41 can be understood by the above-description of step S11. Thus, this step will not be explained as this point for the sake of brevity.

In step S42, the electronic control unit 9 detects if there is a problem with the electrical system. This step serves to determine if the driving-purpose motor-generator 4 is operating normally. For example, when the driving-purpose motor-generator 4 is being used to drive the vehicle at a desired speed, the input signal from the vehicle speed sensor 16 might be used to determine if the actual vehicle speed matches the aforementioned desired vehicle speed. The electronic control unit 9 proceeds to step S43 when the electronic control unit 9 determines that the electrical system is operating properly and to step S44 when the electronic control unit 9 determines that there is a problem with the electrical system.

In step S43, similarly to step S12 of FIG. 7, the electronic control unit 9 determines if the detected battery capacity is extremely low. If the battery capacity is determined to be extremely low, the electronic control unit proceeds to step S44. If not, the electronic control unit 9 proceeds to step S45.

In step S44, the electronic control unit 9 selects an operating mode A' in which the internal combustion engine 1 is operated using spark ignition combustion. In operating mode A', the power obtained by operating the internal combustion engine 1 using spark ignition combustion is generally used to charge the battery 6. However, when the electrical system was determined to have a problem in step S42, the power obtained by operating the internal combustion engine 1 is used to drive the vehicle with the engine 1 operating with spark ignition combustion.

In step S45, similarly to step S14 of FIG. 7, the electronic control unit 9 determines if the battery 6 needs to be charged. If the remaining battery capacity is greater than or equal to the battery maximum value Vmax, the electronic control unit 9 proceeds to step S46 and selects the operating mode B, in which the internal combustion engine 1 is stopped. Meanwhile, if the remaining battery capacity is less than the battery maximum value Vmax, the electronic control unit 6 proceeds to step S47.

In step S47, similarly to step S26 of FIG. 8, the electronic control unit 9 determines if the battery capacity is sufficient even though it is not greater than or equal to the battery maximum value Vmax. If the battery capacity is determined to be sufficient to meet the required vehicle output, then the electronic control unit 9 proceeds to step S48 where it selects the operating mode C, in which the driving-purpose motor-generator 4 is controlled so as to drive the vehicle, while the battery 6 is charged by operating the internal combustion engine 1 using compression self-ignition combustion. Meanwhile, if the battery capacity is determined to be insufficient, the electronic control unit 9 proceeds to step S49 where it selects an operating mode F in which the vehicle is driven by the internal combustion engine 1 operating in the compression self-ignition combustion mode and the excess output of the engine 1 is used to charge the battery 6.

Figure 12:
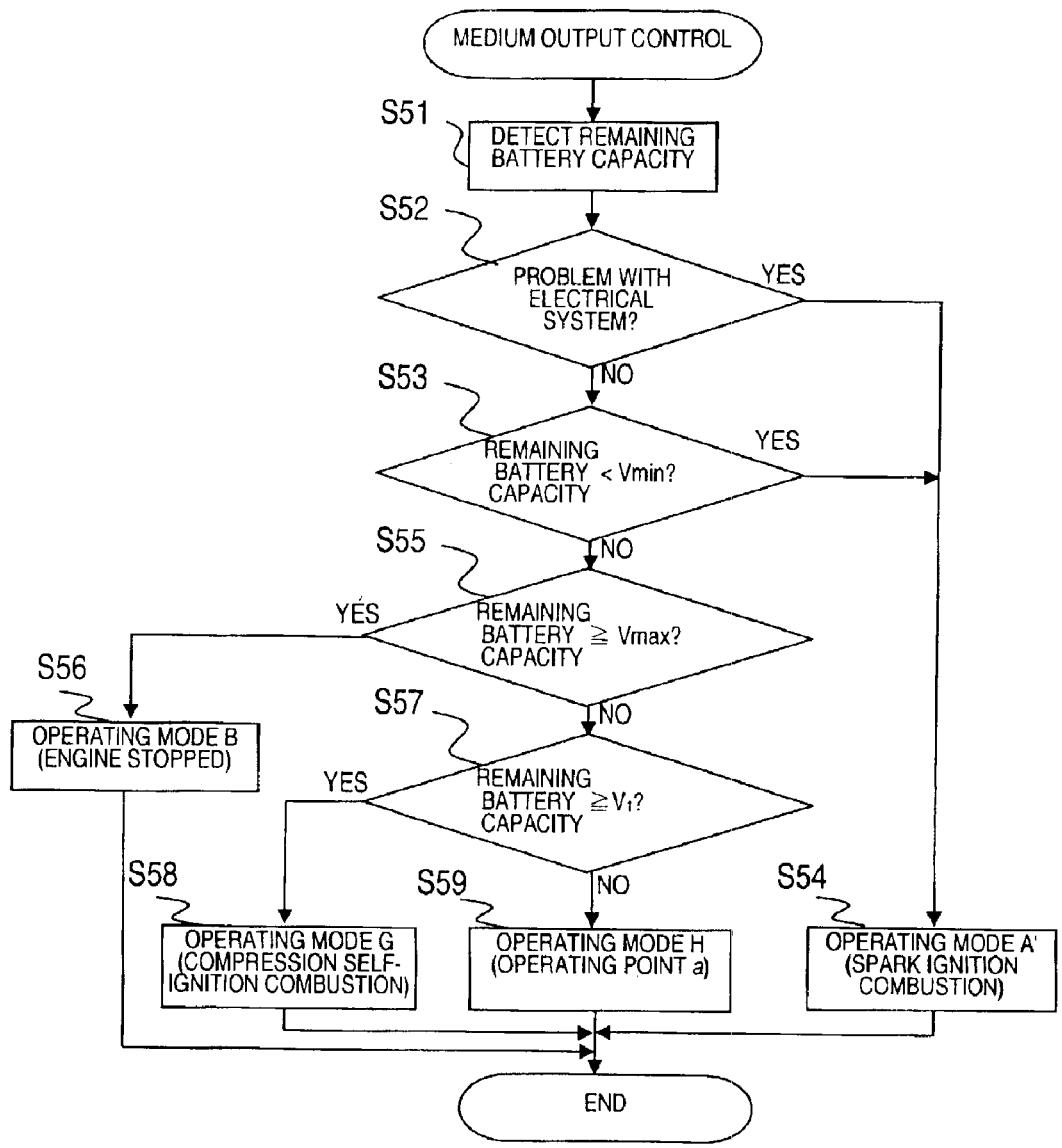
FIG. 12 is a flowchart showing the operation control executed by the hybrid vehicle of the second embodiment when the required output of the vehicle is determined to be medium.

FIG. 12 is a flowchart showing the operation control executed by the electronic control unit 9 in a parallel hybrid vehicle when the required output of the vehicle is determined to be medium.

Since steps S51 to S57 of FIG. 12 are the same as steps S41 to S47 of FIG. 11, the operations of these steps S51 to S57 can be understood by the above-description of steps S41 to S47. Thus, these steps will not be explained as this point for the sake of brevity. If the remaining battery capacity is determined to be sufficient in step S57, the electronic control unit 9 proceeds to step S58 where it selects an operating mode G in which the internal combustion engine 1 is operated using compression self-ignition combustion and the amount by which the output of the engine 1 is insufficient is compensated for (assisted) by the driving-purpose motor-generator 4, i.e., the vehicle is driven by both the internal combustion engine 1 and the driving-purpose motor-generator 4. Meanwhile, if the remaining battery capacity is determined to be insufficient to meet the required vehicle output, the electronic control unit 9 proceeds to step S59 where it selects an operating mode H in which the vehicle is driven by operating the internal combustion engine 1 at the operating point a and the excess output of the engine 1 is used to charge the battery 6.

Figure 13:
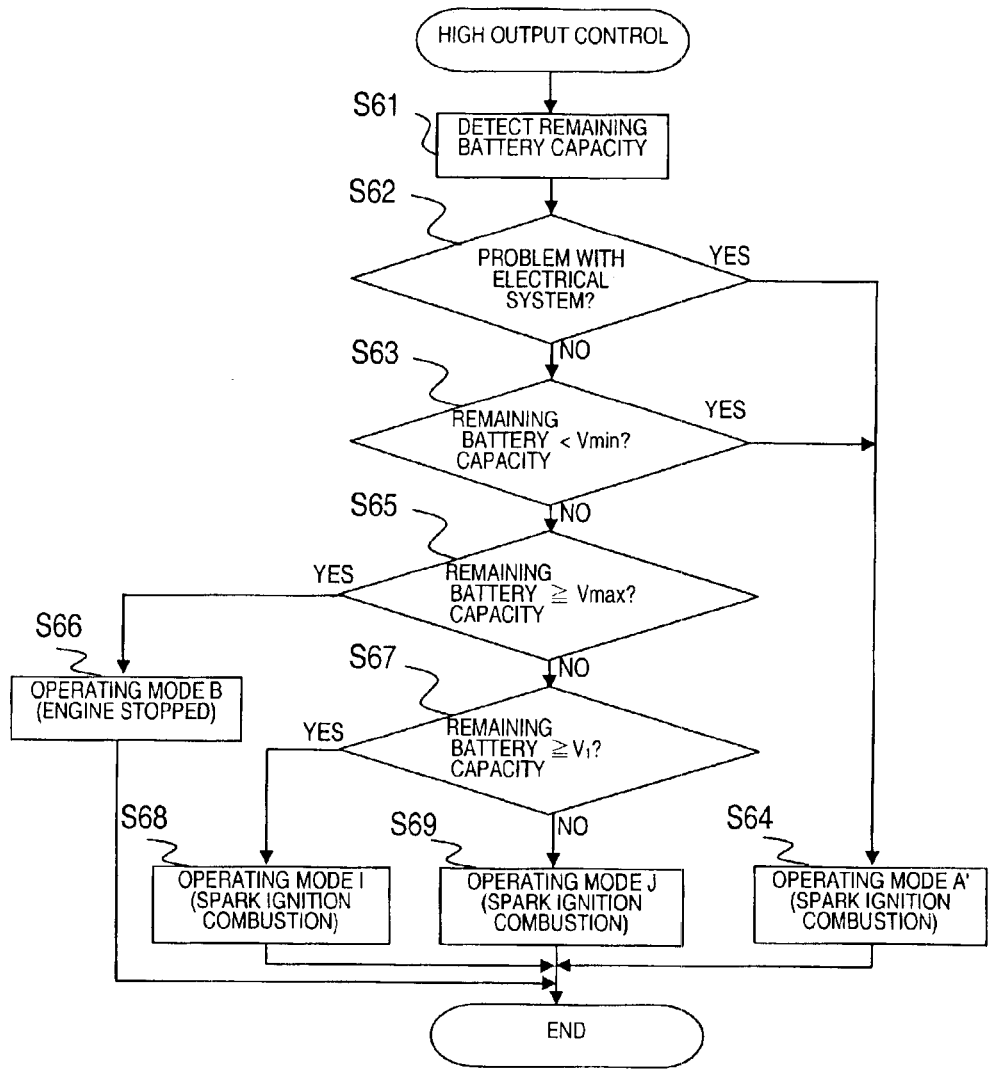
FIG. 13 is a flowchart showing the operation control executed by the hybrid vehicle of the second embodiment when the required output of the vehicle is determined to be high.

FIG. 13 is a flowchart showing the operation control executed by the electronic control unit 9 in a parallel hybrid vehicle when the required output of the vehicle is determined to be high.

Since steps S61 to S67 of FIG. 13 are the same as steps S41 to S47 of FIG. 11, the operations of these steps S61 to S67 can be understood by the above-description of steps S41 to S47. Thus, these steps will not be explained as this point for the sake of brevity. If the remaining battery capacity is determined to be sufficient to meet the required vehicle output in step S67, the electronic control unit 9 proceeds to step S68 where it selects an operating mode 1 in which the internal combustion engine 1 is operated using spark ignition combustion at the operating point a and the amount by which the output of the engine 1 is insufficient to meet the required vehicle output is compensated for (assisted) by the driving-purpose motor-generator 4, i.e., the vehicle is driven by both the internal combustion engine 1 and the driving-purpose motor-generator 4. Meanwhile, if the remaining battery capacity is determined to be insufficient to meet the required vehicle output, the electronic control unit 9 proceeds to step S69 where it selects an operating mode J in which the vehicle is driven by operating the internal combustion engine 1 using spark ignition combustion in accordance with the output required by the vehicle.

In addition to the effects of the first embodiment, mentioned above, this second embodiment has the following six effects.

First, when the output required by the vehicle is below the output of the internal combustion engine 1 when the engine is operated using compression self-ignition combustion and the remaining battery capacity is below the third prescribed capacity, the operating mode F is selected in which the vehicle is driven by operating the internal combustion engine 1 using compression self-ignition combustion and the excess output of the engine 1 is used to operate the driving-purpose motor-generator 4 in a regenerative manner so as to charge the battery 6.

Second, when the output required by the vehicle exceeds the output of the internal combustion engine 1 when the engine 1 is operated using compression self-ignition combustion and the remaining battery capacity is greater than or equal to the third prescribed capacity, the operating mode G is selected in which the internal combustion engine 1 is operated using compression self-ignition combustion and the vehicle is driven by both the internal combustion engine 1 and the driving-purpose motor-generator 4. As a result, even when the output required by the vehicle is comparatively high, the required output can be secured while operating the engine 1 in a highly efficient and clean manner.

Third, when the output required by the vehicle exceeds the output of the internal combustion engine 1 when the engine 1 is operated using compression self-ignition combustion and the remaining battery capacity is below the third prescribed capacity, the operating mode H is selected in which the vehicle is driven by operating the internal combustion engine 1 using spark ignition combustion at the operating point of best fuel efficiency (operating point a) and the excess output of the engine 1 is used to operate the driving-purpose motor-generator 4 in a regenerative manner so as to charge the battery 6. As a result, the output required by the vehicle can be secured reliably, while operating the engine 1 as efficiently as possible.

Fourth, when the output required by the vehicle exceeds the output of the internal combustion engine 1 when the engine 1 is operated at the point of best fuel efficiency (operating point a) and the remaining battery capacity is greater than or equal to the third prescribed capacity, the operating mode 1 is selected in which the internal combustion engine 1 is operated using spark ignition combustion at the point of best fuel efficiency (operating point a) and the vehicle is driven by both the internal combustion engine 1 and the driving-purpose motor-generator 4. As a result, even when the output required by the vehicle is high, the required output can be secured reliably while operating the engine 1 as efficiently as possible.

Fifth, when the output required by the vehicle exceeds the output of the internal combustion engine 1 when the engine 1 is operated at the operating point of best fuel efficiency (operating point a) and the remaining battery capacity is below the third prescribed capacity, the operating mode J is selected in which the internal combustion engine 1 is operated using spark ignition combustion in accordance with the output required by the vehicle. As a result, the required output of the vehicle can be reliably secured even when that required output is high.

Sixth, when it is determined that the driving-purpose motor-generator 4 is not operating normally, an operating mode A' is selected in which the internal combustion engine 1 is operated using spark ignition combustion and the vehicle is driven by the internal combustion engine 1. As a result, the output required by the vehicle can be secured reliably even when there is a problem with the electrical system.

In this embodiment, it is also acceptable to use different values for the sufficient battery capacity V1 (a third prescribed capacity) depending on whether the output required by the vehicle is low, medium or high.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-177372. The entire disclosure of Japanese Patent Application No. 2002-177372 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A hybrid vehicle control apparatus comprising:
an internal combustion engine configured to be selectively operated in one of a compression self-ignition combustion operating mode and a spark ignition combustion operating mode;
an electric generator mechanically coupled to the internal combustion engine;
an electric storage device electrically coupled to the electric generator;
a remaining capacity detecting device configured to detect a remaining capacity of the electric storage device;
an electric motor electrically coupled to the electric storage device; and
an operating mode selecting device configured to control an operating state of the internal combustion engine, the electric generator, and the electric motor, and to select one of the compression self-ignition combustion operating mode and the spark ignition combustion operating mode in accordance with a required vehicle output.
the operating mode selecting device being further configured to select the spark ignition combustion operating mode irrespective of the required vehicle output, and to charge the electric storage device, when the remaining capacity of the electric storage device is less than a first prescribed capacity that was established as a minimum value of the electric storage device.

2. The hybrid vehicle control apparatus as recited in claim 1, wherein
the operating mode selecting device is further configured to select the compression self-ignition combustion operating mode when in a first operating region and using the spark ignition combustion operating mode when in a second operating region having higher engine rotational speed than the first operating region.

3. The hybrid vehicle control apparatus as recited in claim 2, wherein
the first operating region and the second operating region are not close together.

4. The hybrid vehicle control apparatus as recited in claim 2, wherein
the second operating region includes an operating point of best fuel efficiency for the spark ignition combustion operating mode.

5. The hybrid vehicle control apparatus as recited in claim 1, wherein
the operating mode selecting device is further configured to select the compression self-ignition combustion operating mode, and to charge the electric storage device, when the required vehicle output is less than or equal to a prescribed vehicle output value.

6. The hybrid vehicle control apparatus as recited in claim 5, wherein
the operating mode selecting device is further configured to select the spark ignition combustion operating mode at an operating point of best fuel efficiency, and to charge the electric storage device, when the required vehicle output exceeds the prescribed vehicle output value.

7. The hybrid vehicle control apparatus as recited in claim 5, wherein
the operating mode selecting device is further configured to select the spark ignition combustion operating mode in accordance with the required vehicle output, and to charge the electric storage device, when the required vehicle output exceeds an engine output of the internal combustion engine during the spark ignition combustion at an operating point of best fuel efficiency.

8. The hybrid vehicle control apparatus as recited in claim 1, wherein
the operating mode selecting device is further configured to select an operating mode in which operation of the internal combustion engine is stopped, when the remaining capacity of the electric storage device is greater than or equal to a second prescribed capacity equal to or above which charging is unnecessary.

9. A hybrid vehicle control apparatus comprising:
an internal combustion engine configured to be selectively operated in one of a compression self-ignition combustion operating mode and a spark ignition combustion operating mode;
an electric generator mechanically coupled to the internal combustion engine;
an electric storage device electrically coupled to the electric generator;
a remaining capacity detecting device configured to detect a remaining capacity of the electric storage device;
an electric motor electrically coupled to the electric storage device; and
an operating mode selecting device configured to control an operating state of the internal combustion engine, the electric generator, and the electric motor, and to select one of the compression self-ignition combustion operating mode and the spark ignition combustion operating mode in accordance with a required vehicle output.
the operating mode selecting device being further configured to select the compression self-ignition combustion operating mode, and to charge the electric storage device, when the required vehicle output is less than or equal to a prescribed vehicle output value,
the operating mode selecting device being further configured to select the spark ignition combustion operating mode irrespective of the required vehicle output, and to charge the electric storage device, when the remaining capacity of the electric storage device is less than a first prescribed capacity that was established as a minimum value of the electric storage device, and
the operating mode selecting device is further configured to select an operating mode in which operation of the internal combustion engine is stopped, when the remaining capacity of the electric storage device is greater than or equal to a second prescribed capacity equal to or above which charging is unnecessary.

10. The hybrid vehicle control apparatus as recited in claim 9, wherein
the operating mode selecting device is further configured to select the compression self-ignition combustion operating mode, and to charge the electric storage device, when the required vehicle output exceeds the prescribed vehicle output value and the remaining capacity of the electric storage device is greater than or equal to a third prescribed capacity that lies between the first prescribed capacity and the second prescribed capacity.

11. The hybrid vehicle control apparatus as recited in claim 10, the operating mode selecting device is further configured to select an operating mode in which the internal combustion engine is operated at an operating point of best fuel economy, and to charge the electric storage device, when the required vehicle output exceeds an engine output of the internal combustion engine operating the spark ignition combustion operating mode at an operating point of best fuel efficiency and the remaining capacity of the electric storage device is greater than or equal to the third prescribed capacity.

12. The hybrid vehicle control apparatus as recited in claim 10, wherein the internal combustion engine and the electric motor are arranged to operate individually and conjunctively to drive the hybrid vehicle.

13. The hybrid vehicle control apparatus as recited in claim 12, wherein the operating mode selecting device is further configured to select an operating mode in which the hybrid vehicle is set to be driven by the internal combustion engine operating in the compression self-ignition combustion operating mode, and to charge the electric storage device using an excess engine output of the internal combustion engine, when the required vehicle output is less than an engine output of the internal combustion engine operating in the compression self-ignition combustion operating mode and the remaining capacity of the electric storage device is less than the third prescribed capacity.

14. The hybrid vehicle control apparatus as recited in claim 12, wherein the operating mode selecting device is further configured to select an operating mode in which the hybrid vehicle is set to be driven by both the electric motor and the internal combustion engine operating in the compression self-ignition combustion operating mode, when the required vehicle output exceeds an engine output of the internal combustion engine operating in the compression self-ignition combustion operating mode and the remaining capacity of the electric storage device is greater than or equal to the third prescribed capacity.

15. The hybrid vehicle control apparatus as recited in claim 12, wherein the operating mode selecting device is further configured to select an operating mode in which the hybrid vehicle is set to be driven by the internal combustion engine operating in the spark ignition combustion operating mode at an operating point of best fuel efficiency, and to charge the electric storage device using an excess engine output of the internal combustion engine, when the required vehicle output exceeds an engine output of the internal combustion engine operating in the compression self-ignition combustion operating mode and the remaining capacity of the electric storage device is less than the third prescribed capacity.

16. The hybrid vehicle control apparatus as recited in claim 12, wherein the operating mode selecting device is further configured to select an operating mode in which the hybrid vehicle is set to be driven by both the electric motor and the internal combustion engine operating in the spark ignition combustion operating mode at the operating point of best fuel efficiency, when the required vehicle output exceeds an engine output of the internal combustion engine operating in the spark ignition combustion operating mode at an operating point of best fuel efficiency and the remaining capacity of the electric storage device is greater than or equal to the third prescribed capacity.

17. The hybrid vehicle control apparatus as recited in claim 12, wherein the operating mode selecting device is further configured to select an operating mode in which the hybrid vehicle is set to be driven by the internal combustion engine operating in the spark ignition combustion operating mode in accordance with the required vehicle output, when the required vehicle output exceeds an engine output of the internal combustion engine operating in the spark ignition combustion operating mode at an operating point of best fuel efficiency and the remaining capacity of the electric storage device is less than the third prescribed capacity.

18. The hybrid vehicle control apparatus as recited in claim 12, further comprising a determining device configured to determine if the electric motor is operating normally; and the operating mode selecting device is further configured to select an operating mode in which the hybrid vehicle is set to be driven by the internal combustion engine using the spark ignition combustion operating mode, when the determining device determines that the electric motor is not operating normally.

19. A hybrid vehicle control apparatus comprising:

electric generating means for producing electrical energy;

electric storage means for storing the electrical energy produced by the electric generating means;

remaining capacity detecting means for detecting a remaining capacity of the electric storage means;

engine means for driving the electric generating means by selectively operating the engine means in one of a compression self-ignition combustion operating mode and a spark ignition combustion operating mode;

electric motor means for receiving the electrical energy from the electric storage means, and for driving a hybrid vehicle; and controlling means for controlling an operating state of the engine means, the electric generating means, and the electric motor means, for selecting one of the compression self-ignition combustion operating mode and the spark ignition combustion operating mode in accordance with a required vehicle output, and for selecting the spark ignition combustion operating mode irrespective of the required vehicle output to charge the electric storage means when the remaining capacity of the electric storage means is less than a first prescribed capacity that was established as a minimum value of the electric storage means.

* * * * *